(12) United States Patent
Lee et al.

(10) Patent No.: US 9,485,628 B2
(45) Date of Patent: Nov. 1, 2016

(54) USER-LOCATION-IN-BUILDING ESTIMATING APPARATUS AND METHOD THEREOF

(71) Applicant: Samsung Electronics Co., Ltd., Suwon-si, Gyeonggi-do (KR)

(72) Inventors: Jae-myeon Lee, Yongin-si (KR); Jeong-gwan Kang, Hwaseong-si (KR); Hyun-su Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/526,889

(22) Filed: Oct. 29, 2014

(65) Prior Publication Data

US 2015/0119087 A1 Apr. 30, 2015

(30) Foreign Application Priority Data

Oct. 30, 2013 (KR) ........................ 10-2013-0130448

(51) Int. Cl.
*H04W 4/04* (2009.01)
*G01C 21/28* (2006.01)
*H04W 4/02* (2009.01)

(52) U.S. Cl.
CPC ............. *H04W 4/043* (2013.01); *H04W 4/027* (2013.01); *G01C 21/28* (2013.01)

(58) Field of Classification Search
CPC ....... H04W 64/00; H04W 4/02; H04W 4/18; H04W 4/026; H04W 4/20; H04W 52/0229; H04W 4/027; H04B 5/00; H04B 7/00; H04N 21/2143; H04N 21/235; H04N 21/4524; H04N 21/42202; H04N 21/435; H04N 21/43637; H04N 21/41407; G01C 21/28; G01C 21/30; G01C 21/005; G01C 22/006; G01C 7/04; G01C 21/20; G01C 21/3676; G06Q 30/02; G06F 19/00; G01S 5/0027; G01S 5/0081; G01S 5/0284
See application file for complete search history.

(56) References Cited

U.S. PATENT DOCUMENTS

| | | | |
|---|---|---|---|
| 7,558,671 B2 * | 7/2009 | Dossas et al. ................ | 701/481 |
| 2006/0100782 A1 * | 5/2006 | Levi et al. .................... | 701/217 |
| 2011/0200023 A1 * | 8/2011 | Murray et al. ................ | 370/338 |
| 2011/0223938 A1 * | 9/2011 | Sakka ......................... | 455/456.3 |
| 2013/0219437 A1 * | 8/2013 | Ban et al. ...................... | 725/81 |

FOREIGN PATENT DOCUMENTS

| | | |
|---|---|---|
| KR | 10-2010-0137821 A | 12/2010 |
| KR | 10-2011-0083223 A | 7/2011 |
| KR | 10-2012-0003578 A | 1/2012 |

* cited by examiner

*Primary Examiner* — Nizar Sivji
(74) *Attorney, Agent, or Firm* — Jefferson IP Law, LLP

(57) ABSTRACT

An intrabuilding location estimating apparatus and a method thereof are provided. The method includes operations of measuring a user's location by using a global positioning system (GPS) or a wireless communication-based location obtaining device in the mobile terminal, obtaining interfloor movement information of the user that is detected via a sensor in the mobile terminal, and determining a floor on which the user is located, via map information and the interfloor movement information of the user.

20 Claims, 9 Drawing Sheets

USER-LOCATION-IN-BUILDING ESTIMATING APPARATUS AND METHOD THEREOF

CROSS-REFERENCE TO RELATED APPLICATION(S)

This application claims the benefit under 35 U.S.C. §119 (a) of a Korean patent application filed on Oct. 30, 2013 in the Korean Intellectual Property Office and assigned Serial number 10-2013-0130448, the entire disclosure of which is hereby incorporated by reference.

TECHNICAL FIELD

The present disclosure relates to a user-location-in-building estimating apparatus and method thereof. More particularly, the present disclosure relates to a user-location-in-building estimating apparatus and method thereof that are performed by using a wireless communication device and various sensors included in a mobile terminal.

BACKGROUND

According to the related art, a mobile terminal performs distinction between floors by using a Wireless-Fidelity (Wi-Fi) Positioning System (WPS) that uses Wi-Fi signal strength. In more detail, the mobile terminal scans Wi-Fi information obtained from a place where a user is located, compares the Wi-Fi information with data that is obtained from a radio map stored in a server, and estimates a floor on which the user is located.

However, since location of the user is tracked by using a Wi-Fi signal strength, accuracy of the aforementioned method deteriorates. Also, if a Wi-Fi access point (AP) is attached near a ceiling, strengths of signals that are scanned from a lower floor and an upper floor are similar, such that the mobile terminal may cause malfunction.

In order to address the malfunction, filtering may be used. If the filtering is used, the reliability of tracking interfloor movement may be improved but it takes a substantial amount of time to perform such a calculation.

Thus, a response time for providing in real-time a location of a user terminal that frequently moves between floors in a building becomes slow, such that the terminal user may feel uncomfortable.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user-location-in-building estimating apparatus and method thereof capable of rapidly and accurately tracking user's interfloor movement in a building by using a wireless communication-based location obtaining method based on map information, and one or more sensors included in the user-location-in-building estimating apparatus.

Another aspect of the present disclosure is to provide an intrabuilding estimating apparatus and method thereof capable of increasing user's location estimation accuracy by verifying user's location in a building, which is estimated by using a sensor, using a Wi-Fi Positioning System (WPS) or an infrastructure-based location recognition method.

Additional aspects will be set forth in part in the description which follows and, in part, will be apparent from the description, or may be learned by practice of the presented embodiments.

In accordance with an aspect of the present disclosure, a method of estimating a location of a mobile terminal in a building is provided. The method includes operations of measuring a user's location by using a global positioning system (GPS) or a wireless communication-based location obtaining device in the mobile terminal, obtaining interfloor movement information of the user that is detected via a sensor included in the mobile terminal, and determining a floor on which the user is located via map information and the interfloor movement information of the user.

The operation of measuring the user's location may include an operation of obtaining the map information based on the user's location.

The operation of obtaining the interfloor movement information may include operations of obtaining a horizontal movement distance of the user by using pedestrian dead reckoning (PDR), and obtaining a vertical movement distance of the user by using an atmospheric pressure measurement.

If both the horizontal movement distance and the vertical movement distance exceed a predetermined value, the operation of determining the floor may include an operation of determining that the user moves to another floor.

The operation of determining the floor may include operations of obtaining an interfloor distance based on the map information, comparing the interfloor distance with the vertical movement distance, and determining the floor on which the user is located.

The operation of determining the floor may include an operation of comparing a predetermined interfloor distance with the vertical movement distance and determining the floor on which the user is located.

The operation of obtaining the interfloor movement information may include an operation of obtaining, based on the user's location, a displacement of the user by using PDR and mapping the displacement of the user to a map, wherein the displacement occurs due to movement of the user on a specific floor.

The operation of obtaining the interfloor movement information may include operations of obtaining information related to a location of a vertical displacement structure on each floor, based on the map information, and determining whether the user moves using the vertical displacement structure based on a user's location that is mapped to the map.

The operation of determining the floor may include operations of, if it is determined that the user moves using the vertical displacement structure, determining that the user moves to another floor, and determining the floor on which the user is located, based on a distance by which the user has moved using the vertical displacement structure.

After determining the floor, the method may further include an operation of verifying the floor on which the user is located using a WPS or an infrastructure-based location recognition device.

The operation of verifying of the floor may include operations of recognizing the user's location using the WPS or the infrastructure-based location recognition device, and if a floor of the recognized user's location is different from the floor on which the user is located, accurately estimating the user's location via filtering.

The method may further include operations of initially displaying the user's location at the floor on which the user is located using WPS.

In accordance with another aspect of the present disclosure, An apparatus in a mobile terminal for measuring an intrabuilding location is provided The user-location-in-building estimating apparatus includes a location estimating unit for measuring the user's location by using a GPS or a wireless communication-based location obtaining device of the mobile terminal, an interfloor movement information obtaining unit for obtaining interfloor movement information of the user using a sensor included in the mobile terminal, and a floor determining unit for determining a floor on which the user is located, by using map information and the interfloor movement information of the user.

The interfloor movement information obtaining unit may include a horizontal movement obtaining unit for obtaining a horizontal movement distance of the user using PDR, and a vertical movement obtaining unit for obtaining a vertical movement distance of the user by using an atmospheric pressure.

If the horizontal movement distance and the vertical movement distance exceed a predetermined value, the floor determining unit may determine that the user moves to another floor, obtains an interfloor distance based on the map information, compares the interfloor distance with the vertical movement distance, and determines the floor on which the user is located.

The interfloor movement information obtaining unit may further include a user's movement mapping unit that obtains, based on the user's location, a displacement of the user by using PDR and mapping the displacement according to a map, wherein the displacement occurs due to movement of the user on a specific floor.

The floor determining unit may determine whether the user moves by using via a vertical displacement structure, based on a user's location on the map.

If the floor determining unit determines that the user moves via the vertical displacement structure, the floor determining unit may determine that the user moves to another floor and may determine the floor on which the user is located, based on a distance by which the user has moved via the vertical displacement structure.

The user-location-in-building estimating apparatus may further include a user's location verifying unit that verifies the floor on which the user is located using a WPS or an infrastructure-based location recognition device.

In accordance with another aspect of the present disclosure, a non-transitory computer-readable recording medium includes a recorded program for executing the method is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, one or more methods of manufacturing and using one or more embodiments of the present disclosure will be described in detail. In the following description, terms such as "unit" and "module" indicate a unit for processing at least one function or operation, and the unit and the block may be embodied as any combination of hardware and/or software.

In the specification, various changes of "embodiment" related to concepts of the present disclosure mean that a particular characteristic, a particular structure, a particular performance, and the like are included in at least one embodiment of the concepts of the present disclosure. Thus, the expression "embodiment" and other modified embodiments throughout the specification do not necessarily indicate the same embodiment.

Reference will now be made in detail to various embodiments of the present disclosure, examples of which are illustrated in the accompanying drawings.

Figure 1:
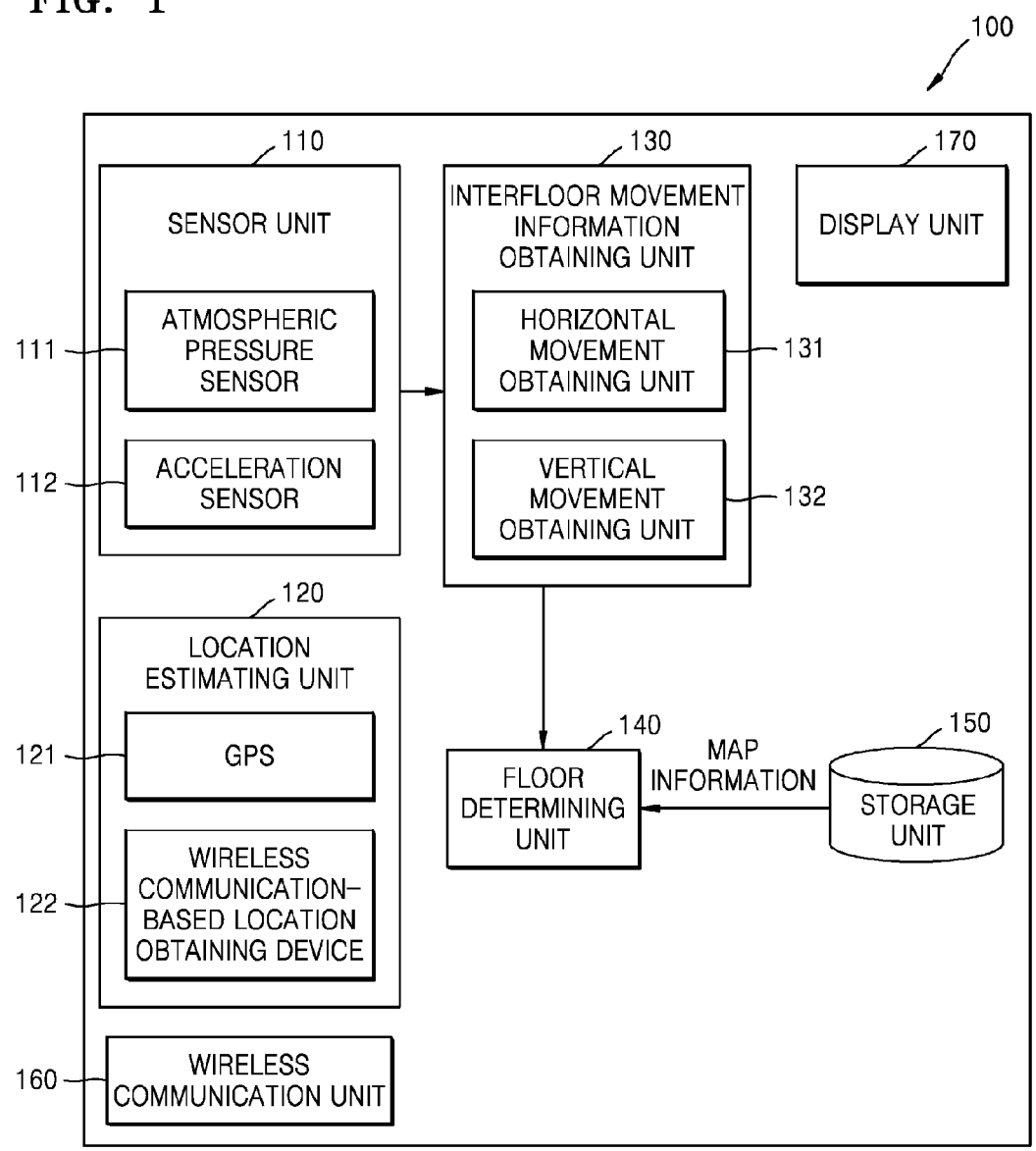
FIG. 1 is a block diagram of a mobile terminal intrabuilding estimating apparatus according to an embodiment of the present disclosure.

FIG. 1 is a block diagram of a mobile terminal intrabuilding estimating apparatus according to an embodiment of the present disclosure.

FIG. 1, illustrates that an intrabuilding estimating apparatus 100 (hereinafter, the intrabuilding estimating apparatus 100) includes elements that are related to a mobile terminal. Thus, one of ordinary skill in the art would understand that other general-use elements may be further included. Also, the intrabuilding estimating apparatus 100 may correspond to a mobile terminal such as a mobile phone, a smartphone, or a tablet personal computer (PC) or may be included as a module in a mobile terminal.

Referring to FIG. 1, the intrabuilding estimating apparatus 100 may include a sensor unit 110, a location estimating unit 120, an interfloor movement information obtaining unit 130, a floor determining unit 140, a storage unit 150, a wireless communication unit 160, and a display unit 170.

The sensor unit 110 may measure movement of a user by using various sensors. The sensor unit 110 may include an acceleration sensor 112, a gyro sensor (not shown), a magnetic field sensor (not shown), an atmospheric pressure sensor 111, or the like. For example, if the user moves to another floor, atmospheric pressure is changed and then the sensor unit 110 converts a change in atmospheric pressure, which is measured by using the atmospheric pressure sensor 111, into a change in height and may determine a vertical displacement of the user.

Also, a movement distance of the user may be calculated based on a change in acceleration that is measured by using the acceleration sensor 112.

The location estimating unit 120 may measure a user's location by using various location displacement sensors. For example, the location estimating unit 120 may include a navigation satellite system such as a global positioning system (GPS) 121 module of the mobile terminal and a wireless communication-based location obtaining device 122. The wireless communication-based location obtaining device 122 may measure the user's location based on a difference in strengths of signals that are received from a plurality of wireless access points (APs) that the mobile terminal uses for wireless communication. The wireless communication may include 3rd generation (3G), 4th generation (4G), Wi-Fi, Bluetooth (BT), near field communion (NFC), and ultra wideband (UWB). However, embodiments of the present disclosure are not limited thereto. Since a method of measuring a location of a mobile terminal user by using the GPS 121 and the wireless communication-based location obtaining device 122 is known in the art, detailed descriptions thereof are omitted here.

The location estimating unit 120 may measure the user's location by using the GPS 121 or the wireless communication-based location obtaining device 122. For example, the location estimating unit 120 may determine whether the user is located in a specific building by using the GPS 121 or the wireless communication-based location obtaining device 122. If the location estimating unit 120 determines that the user is located in the specific building, the location estimating unit 120 may detect a particular floor on which the user is located by using a location tracking method such as a Wi-Fi positioning system (WPS), and thus may estimate a user's location in the specific building.

Also, when the user turns on the mobile terminal and executes a navigation-related application, the location estimating unit 120 may detect an approximate location of the user and may calculate a boundary of a user location. Also, the location estimating unit 120 may obtain map information of the building in which the user is located by using the detected user location. If the boundary of the detected user location is sufficiently large, the location estimating unit 120 may obtain and use all of a plurality of pieces of map information of surrounding buildings.

The interfloor movement information obtaining unit 130 may obtain information about interfloor movement of the user by using one or more sensors included in the sensor unit 110. Here, the interfloor movement information obtaining unit 130 may further include a horizontal movement obtaining unit 131 and a vertical movement obtaining unit 132.

In an embodiment of the present disclosure, the horizontal movement obtaining unit 131 may obtain an amount of horizontal movement of the user by using Pedestrian Dead Reckoning (PDR). PDR is a technique of detecting a speed and/or direction in which a person moves via various sensors and calculating a relative location from a start point. For example, the horizontal movement obtaining unit 131 may calculate the amount of the horizontal movement from the start point by using the acceleration sensor 112.

In an embodiment of the present disclosure, the vertical movement obtaining unit 132 may obtain an amount of vertical movement of the user by using the atmospheric pressure sensor 111. For example, if the user moves to another floor, the atmospheric pressure is changed and the vertical movement obtaining unit 132 converts a change in atmospheric pressure, which is measured by using the atmospheric pressure sensor 111, into a change in heights and thus may recognize a vertical displacement.

If the amount of the horizontal movement of the user and the amount of the vertical movement of the user that are obtained by the interfloor movement information obtaining unit 130 is equal to or greater than a predetermined value, the floor determining unit 140 may determine that the user is currently moving to another floor in the building.

For example, when the horizontal movement obtaining unit 131 obtains, by using the PDR, the amount of the horizontal movement that exceeds the predetermined value, the floor determining unit 140 may determine that the user is currently walking. Also, when the vertical movement obtaining unit 132 obtains the amount of the vertical movement that exceeds the predetermined value, the floor determining unit 140 may determine that the user is traversing a vertical displacement structure (e.g., a staircase, an escalator, etc.). That is, based on the obtained amounts of the horizontal and vertical movements, a walking status of the user may be classified into vertical and/or horizontal displacement. In an embodiment of the present disclosure, the amounts of the horizontal and vertical movements are obtained by using the acceleration sensor 112 and the atmospheric pressure sensor 111, but the embodiments are not limited thereto, thus, a movement status of the user may be determined by using the gyro sensor so that the walking status of the user may be further accurately determined.

Next, the floor determining unit 140 may obtain an interfloor distance based on map information, may compare the interfloor distance with the amount of the vertical movement of the user, and may determine a floor on which the user is located. The map information may be stored in the storage unit 150, and the floor determining unit 140 may obtain the map information of the building in which the user is located based on the user's location measured by the location estimating unit 120. The map information may include the interfloor distance and locations of any vertical displacement structures.

For example, the floor determining unit 140 may compare the amount of the vertical movement with the interfloor distance of the building in which the user is located, wherein the amount of the vertical movement is obtained by the interfloor movement information obtaining unit 130 and the interfloor distance is obtained based on the map information, and, if the amount of the vertical movement is greater than the interfloor distance, the floor determining unit 140 may determine that the user has moved to another floor by traversing a staircase. Also, if the amount of the vertical movement is two times or three times greater than the interfloor distance, the floor determining unit 140 may recognize that the user has moved up or down two or three floors and thus may estimate a floor on which the user is located. If the map information does not include information about the interfloor distance, the floor determining unit 140 may determine whether the user has moved to another floor, based on a common interfloor distance.

In another embodiment of the present disclosure, the floor determining unit 140 may determine an absolute height of the user by using the atmospheric pressure sensor 111, may determine an altitude corresponding to a floor in the map information, and may determine on which floor the user is located.

The storage unit 150 may be formed as a non-volatile storage medium such as a hard disk drive (HDD) or a flash memory that stores digital data. A plurality of maps may be stored in the storage unit 150. Also, the storage unit 150 may store a plurality of pieces of map information (including an interfloor distance and locations of vertical displacement structures on each floor) that correspond to the plurality of maps, respectively.

The wireless communication unit 160 may facilitate communication of the mobile terminal via 3G, 4G, Wi-Fi, BT, NFC, or UWB. In particular, the intrabuilding estimating apparatus 100 may communicate with wireless APs by using the wireless communication unit 160. Also, the intrabuilding estimating apparatus 100 may receive a map and map information from a communication server (not shown) based on the user's location measured by the location estimating unit 120 and may store the map and the map information in the storage unit 150.

The display unit 170 may be implemented by an suitable display such as a liquid crystal display (LCD), a thin film transistor-liquid crystal display (TFT-LCD), an organic light-emitting diode display, a flexible display, a three-dimensional (3D) display, and an electrophoretic display. Also, the display unit 170 may be provided in the form of touch screen. Thus, when the user executes a navigation-related application of the mobile terminal, the display unit 170 may rapidly display a user's location in real-time by using the method of estimating the user's location in the building according to an embodiment of the present disclosure.

Hereinafter, with reference to FIGS. 2 and 3, operations of the intrabuilding estimating apparatus 100 are described in detail.

Figure 2:
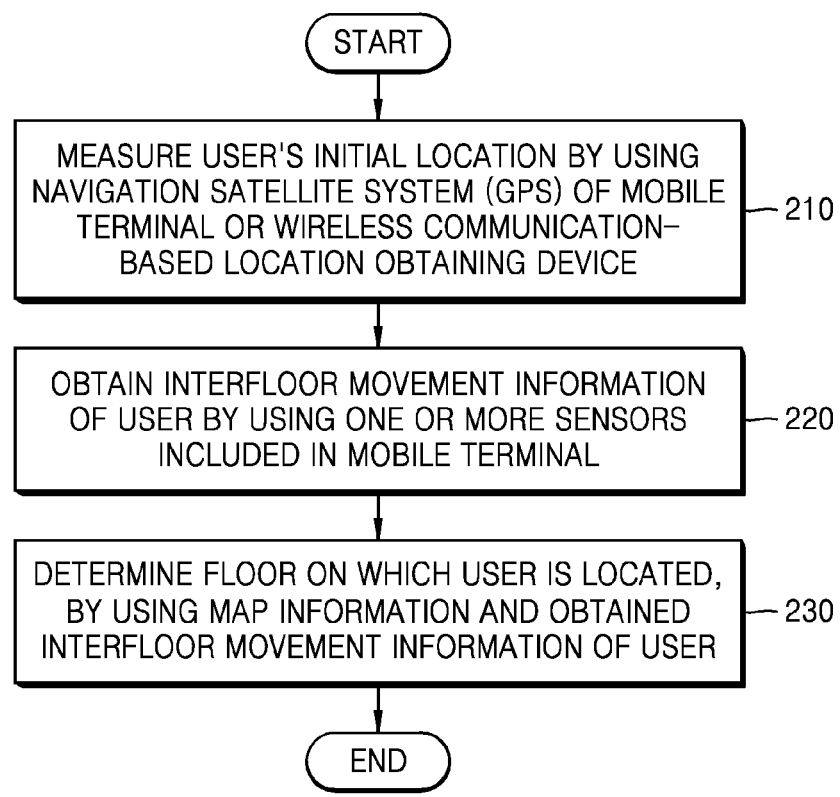
FIG. 2 is a flowchart of a method of estimating a user's location in a building according to an embodiment of the present disclosure.

FIG. 2 is a flowchart of a method of estimating a user's location in a building according to an embodiment of the present disclosure.

In operation 210, the location estimating unit 120 may determine a user's location by using the GPS 121 or the wireless communication-based location obtaining device 122. For example, the location estimating unit 120 may determine, by using the GPS 121 or the wireless communication-based location obtaining device 122, whether a user is located in a specific building. If the location estimating unit 120 determines that the user is located in the specific building, the location estimating unit 120 may recognize a particular floor on which the user is located by using a location tracking method such as a WPS and may measure a user's location in the specific building.

Also, based on the measured user's location, the location estimating unit 120 may obtain map information related to the building in which the user is located.

In operation 220, the interfloor movement information obtaining unit 130 may obtain interfloor movement information of the user by using one or more sensors included in the sensor unit 110.

Here, the interfloor movement information obtaining unit 130 may further include the horizontal movement obtaining unit 131 and the vertical movement obtaining unit 132.

The horizontal movement obtaining unit 131 may obtain an amount of horizontal movement of the user by using PDR. The PDR is a technique of detecting a speed or direction in which a person moves via various sensors and calculating a relative location from a start point. For example, the horizontal movement obtaining unit 131 may calculate the amount of the horizontal movement from the start point by using the acceleration sensor 112.

The vertical movement obtaining unit 132 may obtain an amount of vertical movement of the user by using the atmospheric pressure sensor 111. For example, if the user moves to another floor, the atmospheric pressure is changed and then the vertical movement obtaining unit 132 converts a change in atmospheric pressure, which is measured by using the atmospheric pressure sensor 111, into a change in height and thus may recognize a user's vertical displacement.

In operation 230, the floor determining unit 140 may obtain an interfloor distance based on the map information, compare the interfloor distance with the amount of the vertical movement of the user, and determine a floor on which the user is located.

For example, if the amount of the horizontal movement of the user and the amount of the vertical movement of the user that are obtained by the interfloor movement information obtaining unit 130 exceed a predetermined value, the floor determining unit 140 may determine that the user is currently moving to another floor. Also, when the floor determining unit 140 determines that the user has completed moving to another floor, the floor determining unit 140 may compare the obtained interfloor distance based on the map information with the amount of the vertical movement of the user and determine the floor on which the user is located.

Figure 3:
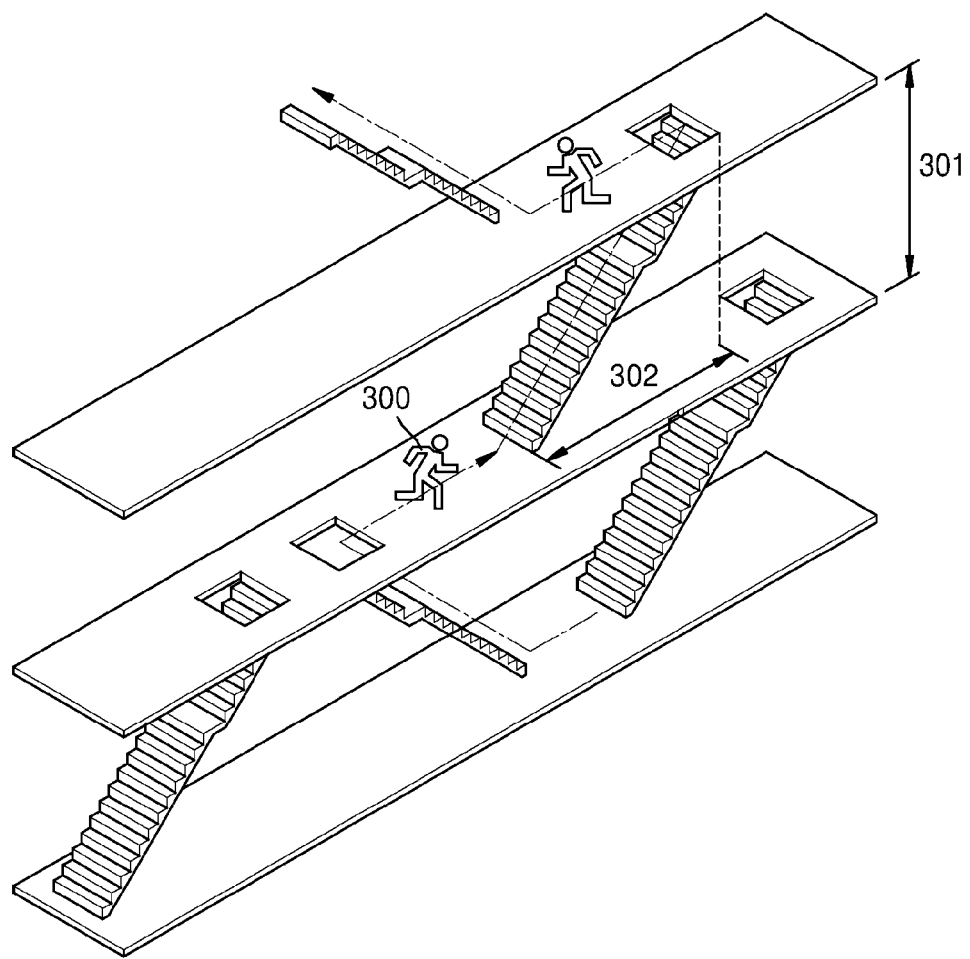
FIG. 3 illustrates an example of a method of estimating a user's location in a building according to an embodiment of the present disclosure.

FIG. 3 illustrates an example of a method of estimating a user's location in a building according to an embodiment of the present disclosure.

Referring to FIG. 3, a user 300 may move by using vertical displacement structures in a building. Thus, when the user 300 moves by using the vertical displacement structure, the intrabuilding estimating apparatus 100 may determine whether an amount of vertical movement of the user 300 is greater than an interfloor distance 301 included in the map information, and may determine whether the user 300 has moved to another floor.

In another embodiment of the present disclosure, if an intrabuilding estimating apparatus 700 (e.g., FIG. 7) is capable of accurately mapping a user's location to a map, the user may be moving via the vertical displacement structure and the intrabuilding estimating apparatus 700 may obtain a distance in which the user moves, compare the distance with a length 302 of the vertical displacement structure in the map information, and determine whether the user has moved to another floor.

Thus, in the embodiment of the present disclosure, the method of estimating a user's location may include determining an initial location of the user by using the GPS 121 or the wireless communication-based location obtaining device 122 having low reactivity with respect to interlayer movement of the user, measure the interlayer movement of the user in the building by using one or more sensors included in the sensor unit 110, and rapidly estimate the user's location.

Also, when a user's location is displayed on a navigation application executed in a mobile terminal of the user, a smooth change in the user's locations in the building may be displayed based on a rapid response time.

Figure 4:
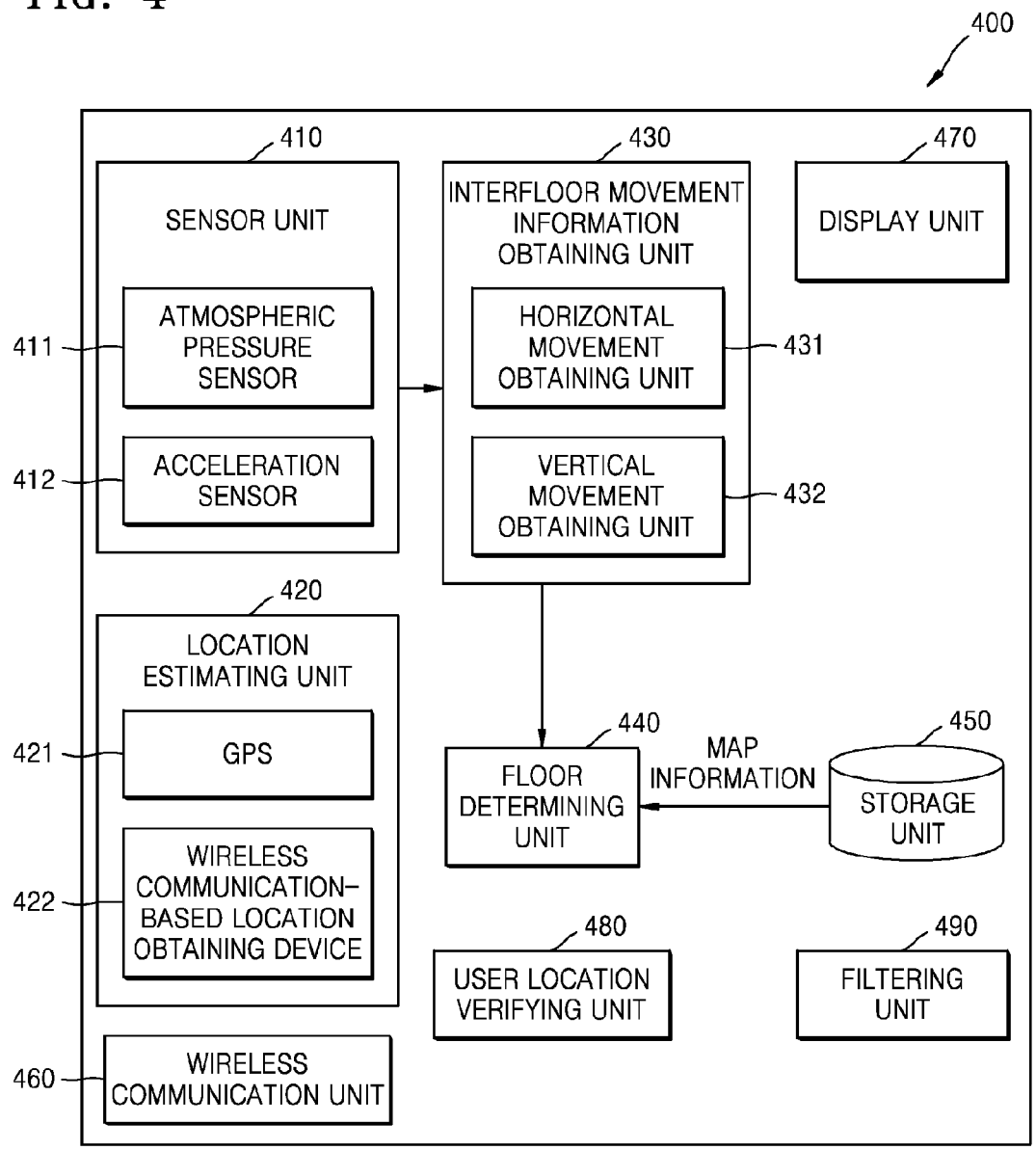
FIG. 4 is a block diagram of an intrabuilding estimating apparatus according to another embodiment of the present disclosure.

FIG. 4 is a block diagram of a intrabuilding estimating apparatus 400 according to another embodiment of the present disclosure.

Referring to FIG. 4, the intrabuilding estimating apparatus 400 may include a sensor unit 410, a location estimating unit 420, an interfloor movement information obtaining unit 430, a floor determining unit 440, a storage unit 450, a wireless communication unit 460, a display unit 470, a user location verifying unit 480, and a filtering unit 490.

The intrabuilding estimating apparatus 400 of FIG. 4 is similar to the intrabuilding estimating apparatus 100 of FIG. 1, thus, differences therebetween are mainly described below.

The user location verifying unit 480 may verify a floor of a user's location determined by the floor determining unit 440, by using a WPS or an infrastructure-based location recognition device (not shown).

For example, when the floor determining unit 440 determines the floor on which a user is located using the map information and the interfloor movement information of the user obtained from the interfloor movement information obtaining unit 420, the user location verifying unit 480 may verify, by using the WPS, whether the user is actually located on the floor that is determined as the floor of the user's location.

The floor determining unit 440 estimates the user's location in a building by using one or more sensors included in a terminal and thus has a fast response time. However, because the floor determining unit 440 determines a relative location with respect to a wireless communication-based location or a location that is measured by a location obtaining device capable of recognizing a current floor, a location error may occur. Further, the WPS may have a slow response time with respect to a change in floors, but accuracy thereof may be increased via filtering of the filtering unit 490.

Thus, in the embodiment of the present disclosure, the user location verifying unit 480 may recognize the user's location by using the WPS, and if a floor that is recognized by using the WPS is different from the floor of the user's location that is determined by the floor determining unit 440, the user location verifying unit 480 may further accurately estimate the user's location via filtering. That is, since the user's location that is estimated by using one or more sensors is verified once more by using the WPS, accuracy of the intrabuilding estimating apparatus 400 may be increased.

In another embodiment of the present disclosure, the user location verifying unit 480 may recognize the user's location by using a wireless communication-based location obtaining device 422 or the infrastructure-based location recognition device, instead of using the WPS, and thus may verify the user's location estimated by the floor determining unit 440.

Here, the infra-based location recognition device may include Bluetooth, a magnetic positioning system (MPS), a light-emitting diode (LED) sensor-based location obtaining device, or an infrared ray (IR) sensor-based location obtaining device, and may also include various devices capable of obtaining a user's absolute location.

The filtering unit 490 may perform filtering to probabilistically minimize an error of the user's location obtained by using the WPS or the infra-based location recognition device. The filtering may be performed by using an extended Kalman filter and a particle filter but one or more embodiments are not limited thereto.

The filtering unit 490 may require a considerable time period to perform the filtering for accurate estimation of the user's location in the building. Thus, in order to rapidly estimate the user's location in the building, the intrabuilding estimating apparatus 400 may first display, on the display unit 470, a change in floors and the user's location determined by the floor determining unit 440. Afterward, when the filtering unit 490 completes the filtering and the user's location is further accurately estimated, the intrabuilding estimating apparatus 400 may display the estimated user's location on the display unit 470.

Hereinafter, with reference to FIGS. 5 and 6, operations of the intrabuilding estimating apparatus 400 are described in detail.

Figure 5:
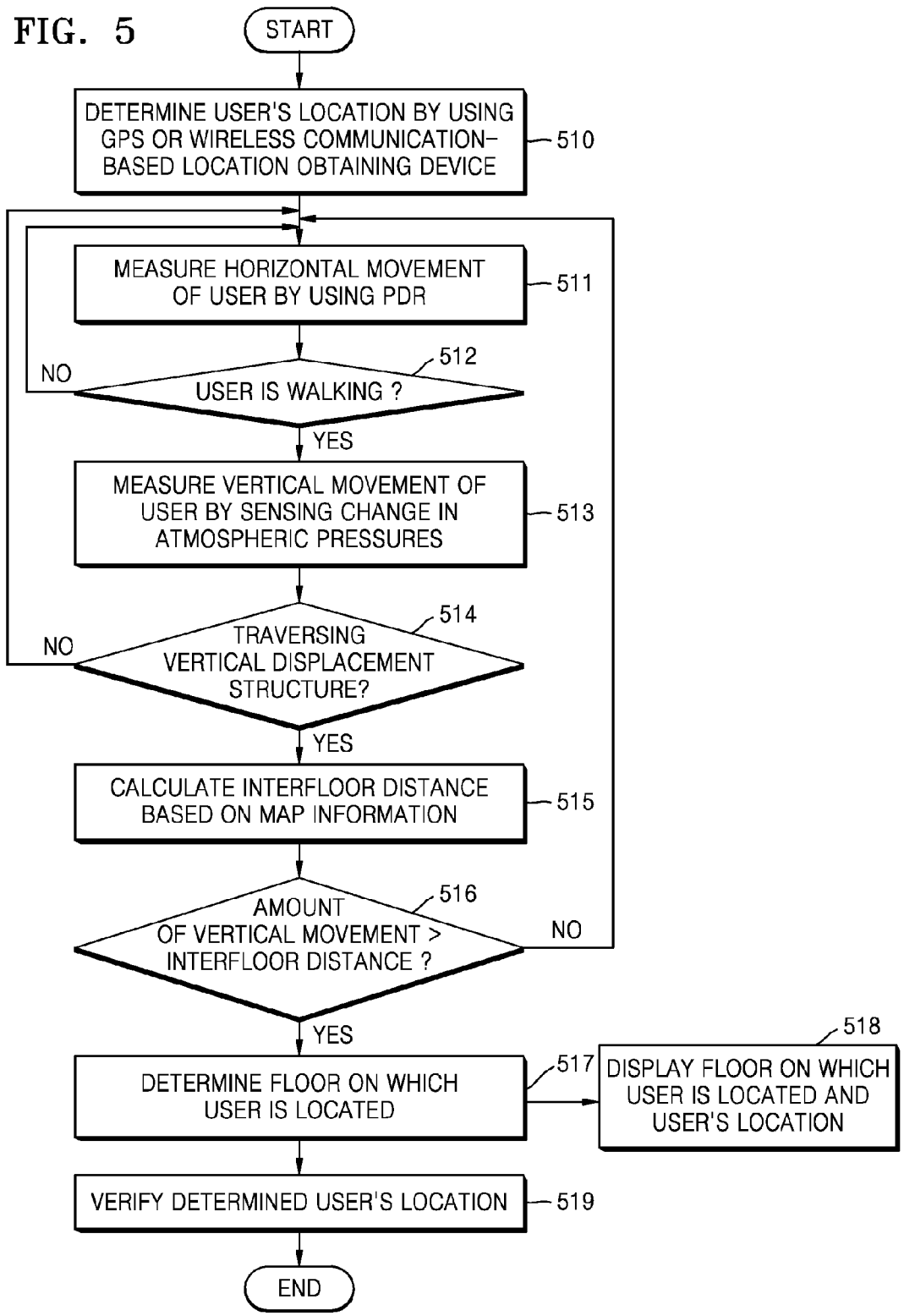
FIG. 5 is a flowchart of a method of estimating a user's location in a building according to another embodiment of the present disclosure.
Figure 6:
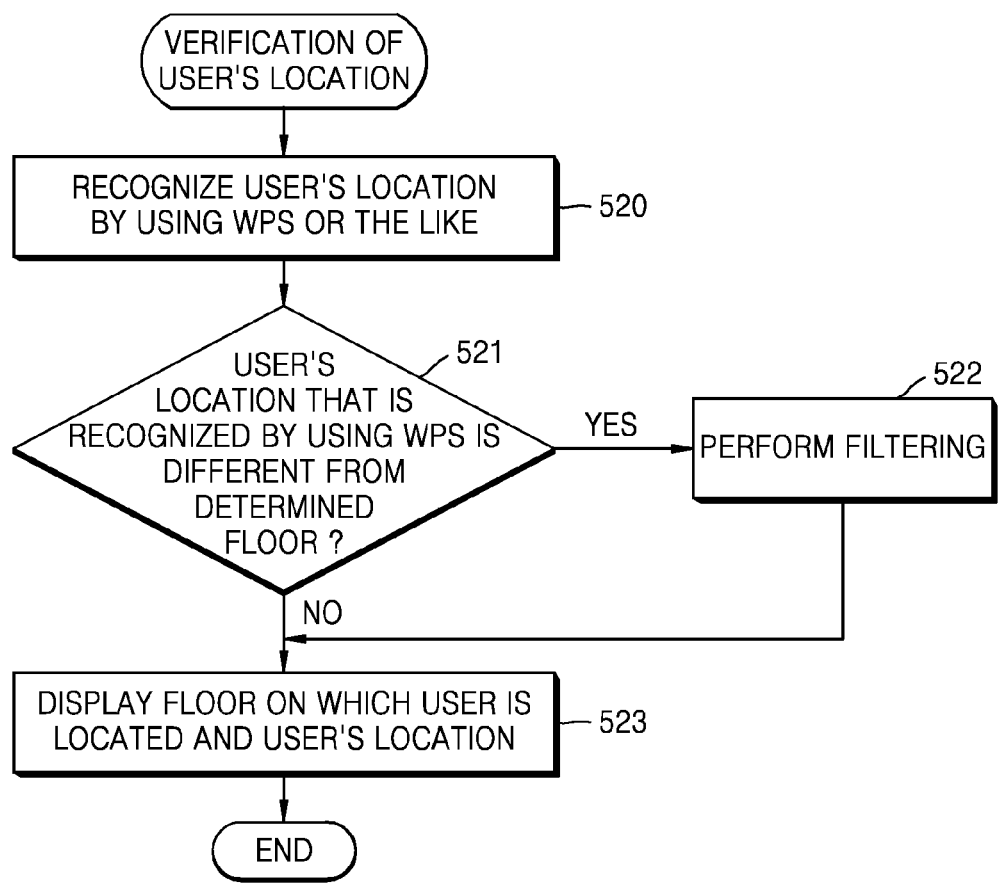
FIG. 6 is a flowchart of a method of verifying an estimated user's location according to an embodiment of the present disclosure.

Referring to FIGS. 5 and 6, estimating a user's location in a building includes operations that are processed in chronological order in each of the intrabuilding estimating apparatuses 100 and 400 shown in FIGS. 1 and 4, respectively. Thus, hereinafter, although descriptions are omitted, if the descriptions are described above with reference to the intrabuilding estimating apparatuses 100 and 400 shown in FIGS. 1 and 4, the descriptions may also be applied to the methods of FIGS. 5 and 6.

FIG. 5 is a flowchart of a method of estimating a user's location in a building according to another embodiment of the present disclosure.

Referring to FIG. 5, the location estimating unit may determine a user's location by using a GPS or the wireless communication-based location obtaining device in operation 510.

In operation 511, a horizontal movement obtaining unit may measure horizontal movement of a user by using PDR. Also, the horizontal movement obtaining unit may obtain an amount of horizontal movement of the user by using an acceleration sensor.

In operation 512, if the horizontal movement obtaining unit obtains the amount of the horizontal movement that is equal to or greater than a predetermined value, the horizontal movement obtaining unit may determine that the user is currently walking. However, if the horizontal movement is not measured, the horizontal movement obtaining unit returns to operation 511 and measures horizontal movement. Here, the predetermined value of the horizontal movement by which the horizontal movement obtaining unit determines that the user is currently walking may be a distance value of one step of the user, but one or more embodiments are not limited to the distance value.

If the horizontal movement that is equal to or greater than the predetermined value occurs, the horizontal movement obtaining unit determines that the user is currently walking, proceeds to operation 513, and determines whether the user is traversing a vertical displacement structure.

In operation 513, a vertical movement obtaining unit may measure vertical movement of the user by using an atmospheric pressure sensor 411.

For example, when the user moves to another floor, atmospheric pressure is changed and then the vertical movement obtaining unit converts a change in atmospheric pressure, which is measured by using the atmospheric pressure sensor, into a change in altitude and thus may obtain an amount of the vertical movement of the user.

In operation 514, if the change in the atmospheric pressure is equal to or greater than a predetermined value (or if the amount of the vertical movement that is converted based on the change in the atmospheric pressures is equal to or greater than the predetermined value), the floor determining unit may recognize that the user is currently traversing a vertical displacement structure. After the floor determining unit determines that the user is currently walking, if the change in the atmospheric pressure is equal to or greater than the predetermined value, the floor determining unit may determine that the user is currently traversing a vertical displacement structure. The predetermined value of the vertical movement may not be limited to a specific value and may be sufficient with an experiential or test value by which the floor determining unit may determine that the user is currently traversing a vertical displacement structure.

If the floor determining unit recognizes that the user is currently traversing a vertical displacement structure, in operation 515, the floor determining unit may obtain an interfloor distance from the map information. If the map information does not include the interfloor distance, the floor determining unit may refer to another interfloor distance that is commonly used for buildings.

In operation 516, the floor determining unit may compare the amount of the vertical movement of the user with the interfloor distance that is obtained based on the map information and thus may determine whether the user has moved to another floor.

If the floor determining unit determines that the user has moved to another floor, in operation 517, the floor determining unit may compare the amount of the vertical movement of the user with the interfloor distance that is obtained based on the map information and may determine a floor on which the user is located. For example, if the amount of the vertical movement is two times or three times greater than the interfloor distance, the floor determining unit may recognize that the user has moved up or down two or three floors to estimate the floor on which the user is located.

In operation 518, after the floor determining unit determines the floor on which the user is located, the determined user's location may be rapidly displayed for the user on the display unit.

In operation 519, the user location verifying unit may verify the floor of the user's location that is determined by the floor determining unit, by using a WPS or an infra-based location recognition device.

Here, verifying, by the user location verifying unit, the floor on which the user is located will now be described in detail with reference to FIG. 6.

FIG. 6 is a flowchart of a method of verifying a user's location according to an embodiment of the present disclosure.

Referring to FIG. 6, in operation 520, the user location verifying unit may recognize the user's location by using a WPS. In another embodiment of the present disclosure, the user location verifying unit may recognize the user's location by using a location measuring method having high accuracy, other than the WPS.

In operation 521, the user location verifying unit may determine whether a floor that is recognized using the WPS is different from a floor that is determined by the floor determining unit.

If the floor that is recognized by the user location verifying unit using the WPS is equal to the floor determined by the floor determining unit, the verification is ends and the method proceeds to operation 523 and to display the user's location on the floor that was determined by the floor determining unit in operation 518 of FIG. 5.

However, if the floor that is recognized by the user location verifying unit using the WPS is different from the floor determined by the floor determining unit, the method proceeds to operation 522.

In operation 522, the filtering unit may accurately estimate the user's location. For example, the filtering unit may perform, by using an extended Kalman filter or a particle filter filtering, on the user's location that was estimated by using the WPS, and thus may accurately recognize the floor on which the user is located.

In operation 522, the user's location that is accurately estimated via the filtering may be displayed again on the display unit. That is, even when the floor that is recognized by the user location verifying unit using the WPS is different from the floor determined by the floor determining unit, the user's location determined by the floor determining unit may be first displayed for a fast response time, and afterward, when the filtering unit accurately estimates the user's location via the filtering, the accurately-estimated user's location may be displayed again.

As described above, according to the method of estimating a user's location in a building, the floor on which the user is located is estimated by using one or more sensors and thus the user's location in the building is rapidly estimated, and then the estimated user's location is verified once more by using the WPS or the infrastructure-based location recognition device, so that accuracy user location may be increased.

Figure 7:
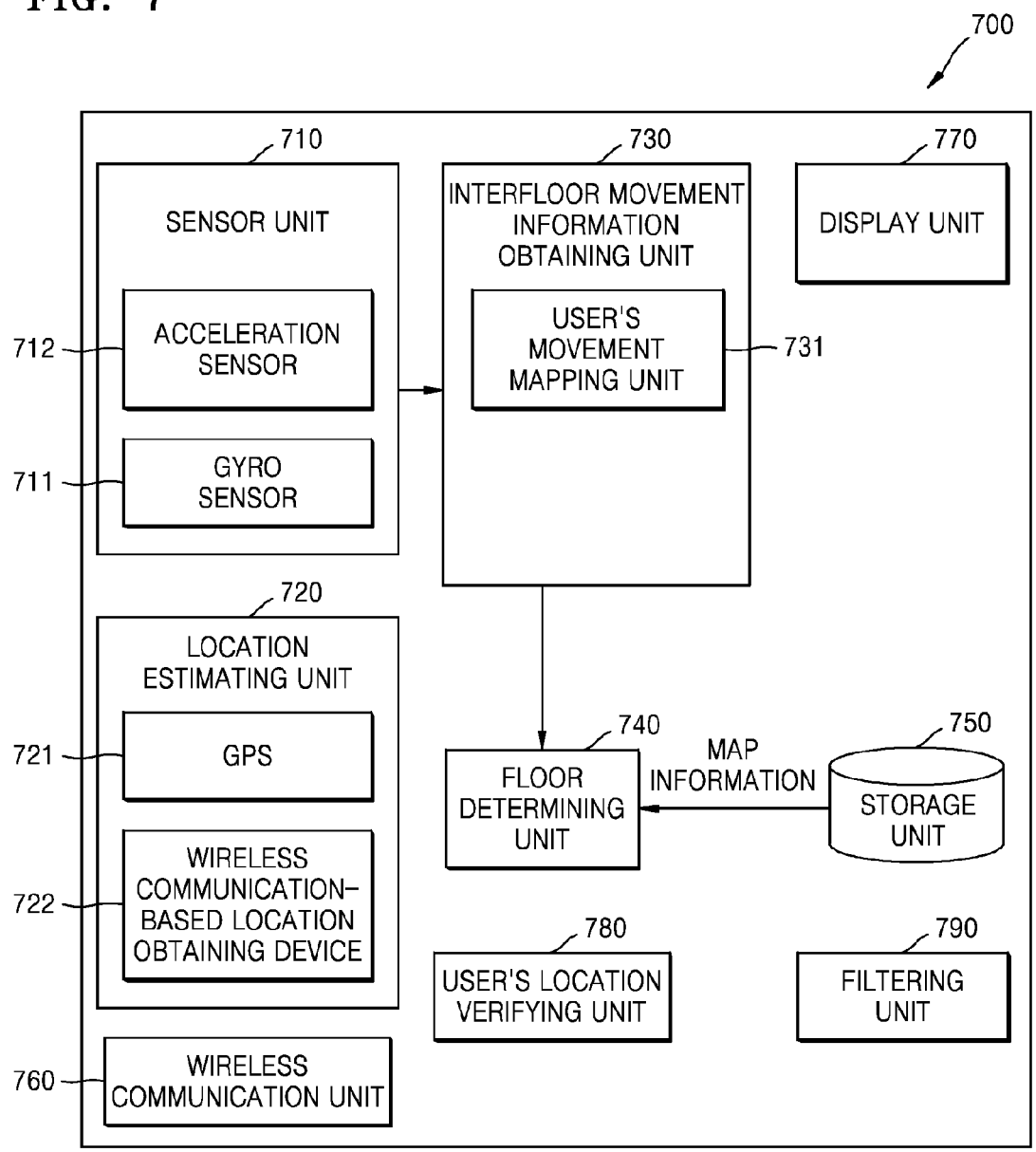
FIG. 7 is a block diagram of the intrabuilding estimating apparatus according to another embodiment of the present disclosure.

FIG. 7 is a block diagram of the intrabuilding estimating apparatus 700 according to another embodiment of the present disclosure.

Referring to FIG. 7, the intrabuilding estimating apparatus 700 may include a sensor unit 710, a location estimating unit 720, an interfloor movement information obtaining unit 730, a floor determining unit 740, a storage unit 750, a wireless communication unit 760, a display unit 770, a user's location verifying unit 780, and a filtering unit 790.

The intrabuilding estimating apparatus 700 of FIG. 7 is similar to the intrabuilding estimating apparatuses 100 and 400 of FIGS. 1 and 4, thus, differences therebetween are mainly described below.

The interfloor movement information obtaining unit 730 may include a user's movement mapping unit 731.

The user's movement mapping unit 731 may obtain, based on a user's location measured by the location estimating unit 720, a displacement of a user by using PDR. Here, the PDR may be implemented differently as compared to the PDR with reference to the horizontal movement obtaining unit 131 of FIG. 1. For example the PDR may calculate a relative displacement from a start point by detecting a speed, direction, or a distance in which a person moves using a gyro sensor 711 and/or an acceleration sensor 712. That is, the user's movement mapping unit 731 may recognize, using the PDR, not only a distance in which the user moves but may also recognize a direction in which the user proceeds, thus, the user's movement mapping unit 731 may obtain the displacement of the user.

Therefore, the user's movement mapping unit 731 may map the user displacement to a map, wherein the displacement that occurs according to movement of the user on a specific floor that is obtained by using the PDR measured by the location estimating unit 720. Here, the map may indicate map data of a floor of the user's location that is determined the location estimating unit 720, or may indicate map data of the user's location that is accurately measured via filtering of the filtering unit 790.

The floor determining unit 740 may obtain, based on map information, information related to locations of any vertical displacement structures on each floor, and may determine, based on the user's location that is mapped to the map, whether the user moves using a vertical displacement structure. Also, based on a distance in which the user moves by using the vertical displacement structure, the floor determining unit 740 may determine a floor on which the user is located.

Thus, the floor determining unit 740 may determine whether the user moves via the vertical displacement structure without using the atmospheric pressure sensor. If the atmospheric pressure sensor 111 (refer to FIG. 1) is also used, a recognition rate may be further increased.

Hereinafter, with reference to FIGS. 8 and 9, operations of the intrabuilding estimating apparatus 700 are described in detail.

Figure 8:
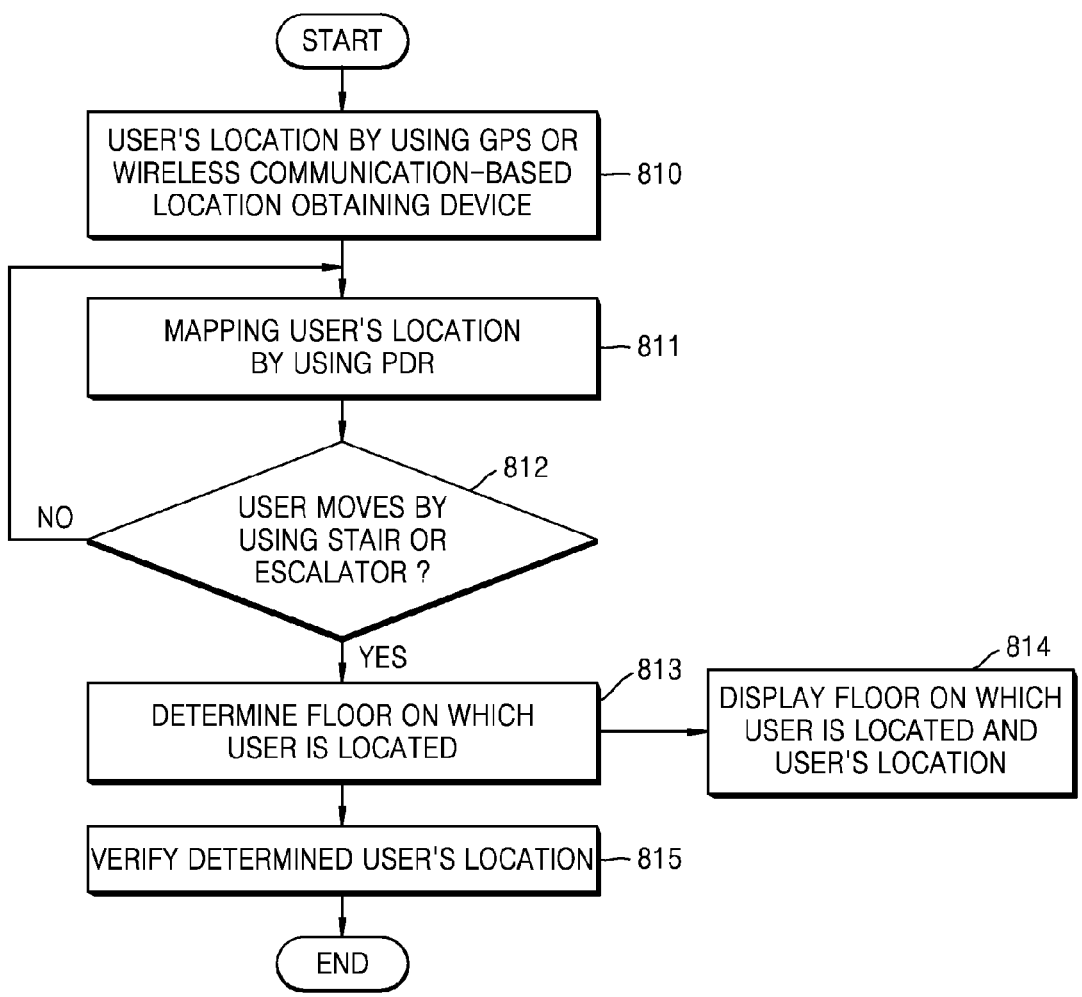
FIG. 8 is a flowchart of a method of estimating a user's location in a building according to another embodiment of the present disclosure.

FIG. 8 is a flowchart of a method of estimating a user's location in a building according to another embodiment of the present disclosure.

The method of FIG. 8 is similar to the method of FIG. 5, thus, differences therebetween are mainly described below.

Referring to FIG. 8, the location estimating unit may determine a user's location by using a GPS or a wireless communication-based location obtaining device in operation 810.

In operation 811, the user's movement mapping unit may obtain, based on the user's location measured by the location estimating unit, a displacement of a user using PDR, and may map the displacement of the user to a map, wherein the displacement occurs due to movement of the user on a specific floor.

In operation 812, the floor determining unit may obtain, based on map information, information related to locations of any vertical displacement structures on each floor, and may determine, based on the user's location that is mapped to the map, whether the user moves via a vertical displacement structure. For example, when the user moves via the vertical displacement structure, the floor determining unit may determine that the user moves to another floor.

In operation 813, the floor determining unit may determine a floor on which the user is located, based on a distance in which the user has moved by using the vertical displacement structure.

Since operations 814 and 815 are similar to operations 518 and 519 of FIG. 5, detailed descriptions thereof are omitted.

Figure 9:
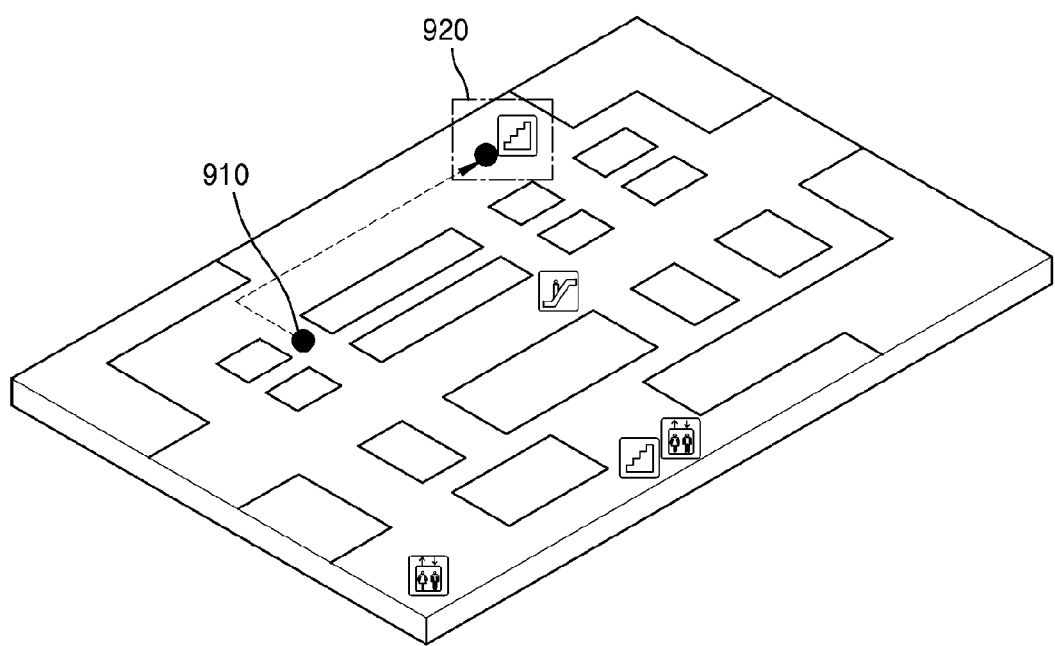
FIG. 9 is a flowchart of a method of estimating a user's location in a building according to another embodiment of the present disclosure.

FIG. 9 is a flowchart of a method of estimating a user's location in a building according to another embodiment of the present disclosure.

Referring to FIG. 9, the user's movement mapping unit may map a location of a user 910 to a map using PDR.

Next, when a location 920 of a vertical displacement structure is obtained based on map information, the floor determining unit may determine, based on the mapped location of the user 910, whether the user 910 has moved to the location 920 of the vertical displacement structure on the floor.

If the floor determining unit determines that the user 910 moves to the vertical displacement structure, the floor determining unit may determine if the user 910 moves to another floor.

Therefore, the floor determining unit may compare a distance in which the user has moved via the vertical displacement structure with a length (e.g., the length 302 of the vertical displacement structure of FIG. 3) that is obtained from the map information, and thus may determine whether the user 910 has moved to another floor.

Also, as described above with reference to FIG. 6, the intrabuilding estimating apparatus may verify, by using the WPS, the user's location that is determined by the floor determining unit, and thus may increase accuracy of estimating the user's location.

As described above, according to the one or more of the above embodiments of the present disclosure, each of the intrabuilding estimating apparatuses 100, 400, and 700 may rapidly and accurately estimate interfloor movement of the user in a building by using a wireless communication-based location obtaining method, one or more sensors included in a terminal, and map information.

Also, each of the intrabuilding estimating apparatuses 400 and 700 may verify the user's location in the building, which was estimated by using the one or more sensors, by using the WPS or the infra-based location recognition method, and thus may increase accuracy of estimating the user's location in the building.

Accordingly, it is possible to provide a fast and accurate location-based service (LBS) in an indoor environment by using the method of estimating a user's location in a building, and furthermore, even when the user's location is changed in the building, changed locations may be continuously recognized.

The various embodiments of the present disclosure can be written as computer programs and can be implemented in general-use digital computers that execute the programs using a computer readable recording medium. Examples of the computer readable recording medium include magnetic storage media (e.g., read-only media (ROM), floppy disks, hard disks, etc.), optical recording media (e.g., compact disk ROMs (CD-ROMs), or digital versatile disks (DVDs)), etc.

It should be understood that the various embodiments of the present disclosure described herein should be considered in a descriptive sense only and not for purposes of limitation. Descriptions of features or aspects within each embodiment of the present disclosure should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of estimating a location of a mobile terminal in a building, the method comprising:
measuring a user's location by using a global positioning system (GPS) or a wireless communication-based location obtaining device in the mobile terminal;

obtaining interfloor movement information of the user that is detected via a sensor in the mobile terminal;

determining a floor on which the user is located via map information and the interfloor movement information of the user; and displaying at least one of the user's location, the interfloor movement information, and the determined floor, wherein the obtaining of the interfloor movement information comprises:

obtaining a horizontal movement distance of the user using pedestrian dead reckoning (PDR); and obtaining a vertical movement distance of the user using an atmospheric pressure measurement.

2. The method of claim 1, wherein the measuring of the user's location comprises obtaining the map information based on the user's location.

3. The method of claim 1, wherein, if both the horizontal movement distance and the vertical movement distance exceed a predetermined value, the determining of the floor comprises determining that the user moves to another floor.

4. The method of claim 3, wherein the determining of the floor comprises:

obtaining an interfloor distance based on the map information, comparing the interfloor distance with the vertical movement distance, and determining the floor on which the user is located.

5. The method of claim 3, wherein the determining of the floor comprises:

comparing a predetermined interfloor distance with the vertical movement distance, and determining the floor on which the user is located.

6. The method of claim 1, wherein the obtaining of the interfloor movement information comprises:

obtaining, based on the user's location, a displacement of the user by using PDR, and mapping the displacement of the user to a map, wherein the displacement occurs due to movement of the user on a specific floor.

7. The method of claim 6, wherein the obtaining of the interfloor movement information comprises:

obtaining information related to a location of a vertical displacement structure on each floor, based on the map information; and determining whether the user moves using the vertical displacement structure based on a user's location that is mapped to the map.

8. The method of claim 7, wherein the determining of the floor comprises:

determining, if it is determined that the user moves using the vertical displacement structure, that the user moves to another floor; and determining the floor on which the user is located based on a distance by which the user has moved using the vertical displacement structure.

9. The method of claim 1, further comprising, after the determining of the floor, verifying the floor on which the user is located using a Wi-Fi positioning system (WPS) or an infrastructure-based location recognition device.

10. The method of claim 9, wherein the verifying of the floor comprises:

recognizing the user's location using the WPS or the infrastructure-based location recognition device; and estimating, if a floor of the recognized user's location is different from the floor on which the user is located, the user's location via filtering.

11. The method of claim 10, further comprising:

initially displaying the user's location at the floor on which the user is located using the WPS.

12. The method of claim 11, further comprising:

displaying, after the estimating of the user's location via filtering and after initially displaying the user's location using the WPS, the estimated user's location determined via the filtering.

13. A non-transitory computer-readable recording medium having recorded thereon a program for executing the method of claim 1.

14. An apparatus including a processor and a memory in a mobile terminal for measuring an intrabuilding location, the apparatus comprising:

a location estimating unit configured to measure a user's location by using a global positioning system (GPS) or a wireless communication-based location obtaining device of the mobile terminal;

an interfloor movement information obtaining unit configured to obtain interfloor movement information of the user using a sensor in the mobile terminal;

a floor determining unit configured to determine a floor on which the user is located by using map information and the interfloor movement information of the user; and a display unit configured to display at least one of the user's location, the interfloor movement information, and the determined floor, wherein the interfloor movement information obtaining unit comprises:

a horizontal movement obtaining unit configured to obtain a horizontal movement distance of the user using pedestrian dead reckoning (PDR); and a vertical movement obtaining unit configured to obtain a vertical movement distance of the user using an atmospheric pressure.

15. The apparatus of claim 14, wherein, if the horizontal movement distance and the vertical movement distance exceed a predetermined value, the floor determining unit is further configured to:

determine that the user moves to another floor, obtain an interfloor distance based on the map information, compare the interfloor distance with the vertical movement distance, and determine the floor on which the user is located.

16. The apparatus of claim 14, wherein the interfloor movement information obtaining unit further comprises a user movement mapping unit configured to:

obtain, based on the user's location, a displacement of the user using PDR, and map the displacement according to a map, wherein the displacement occurs due to movement of the user on a specific floor.

17. The apparatus of claim 16, wherein the floor determining unit is further configured to determine whether the user moves via a vertical displacement structure based on a user's location on the map.

18. The apparatus of claim 17, wherein, if the floor determining unit determines that the user moves via the vertical displacement structure, the floor determining unit is further configured to:

determine that the user moves to another floor, and determine the floor on which the user is located based on a distance by which the user has moved via the vertical displacement structure.

19. The apparatus of claim 14, further comprising a user location verifying unit configured to verify the floor on which the user is located using a Wi-Fi Positioning System (WPS) or an infrastructure-based location recognition device.

20. An electronic device comprising:
a memory storing computer instructions;
a processor configured to execute the instructions to perform a method comprising:
identifying a location of a user by using a global positioning system (GPS) or a wireless communication-based location obtaining apparatus of the electronic device,
obtaining interfloor movement information of the user that is detected via a sensor of the electronic device, the interfloor movement information including a horizontal movement distance of the user obtained based on pedestrian dead reckoning (PDR) and a vertical movement distance of the user obtained based on an atmospheric pressure measurement, and
determining a floor on which the user is located via map information and the interfloor movement information of the user; and
a display unit configured to display at least one of the user's location, the interfloor movement information, and the determined floor.

* * * * *